United States Patent

Bennett et al.

[15] 3,690,590

[45] Sept. 12, 1972

[54] COAXIAL TAPE CARTRIDGE

[72] Inventors: William Coffey Bennett, Menlo Park; Edwin O. Stastny, Santa Ana, both of Calif.

[73] Assignee: Novar Corporation, Mountain View, Calif.

[22] Filed: Jan. 6, 1970

[21] Appl. No.: 886

[52] U.S. Cl.......................................................242/194

[51] Int. Cl...........................G11b 23/10, G11b 15/43

[58] Field of Search......242/194, 193, 197, 198, 199, 242/200, 186, 188, 189, 190, 54.1

[56] References Cited

UNITED STATES PATENTS

| | | | |
|---|---|---|---|
| 2,477,146 | 7/1949 | Scherbatskoy | 242/54.1 |
| 2,557,012 | 6/1951 | Shrader | 242/54.1 |
| 2,869,799 | 1/1959 | Hunter | 242/194 |
| 3,252,669 | 5/1966 | Geri | 242/194 |
| 2,988,954 | 6/1961 | Kuhnert et al. | 242/198 X |
| 3,042,331 | 7/1962 | Bierman | 242/194 |
| 3,257,515 | 6/1966 | Nakamatsu | 242/188 |
| 2,584,733 | 2/1952 | Owens | 242/198 |
| 3,236,428 | 2/1966 | Yamane | 242/188 X |
| 3,325,111 | 6/1967 | Prager | 242/197 |

*Primary Examiner*—George F. Mautz
*Attorney*—O'Malley, Jay, Lawler

[57] ABSTRACT

A tape cartridge including a housing adapted to support a pair of coaxially disposed tape reels. Means for guiding the tape extending from one reel to the other past the front of the cartridge. A spring-loaded back-up roller for urging the tape towards an associated capstan. Spring means cooperate between said reels to rotate the reels in opposite directions to maintain suitable tape tension and drive one reel from the other.

6 Claims, 7 Drawing Figures

WILLIAM C. BENNETT
EDWIN O. STASTNY
INVENTORS

BY Flehr, Hohbach, Test, Albritton and Herbert
ATTORNEYS

WILLIAM C. BENNETT
EDWIN O. STASTNY
INVENTORS

BY Flehr, Hohbach, Test, Albritton and Herbert
ATTORNEYS

COAXIAL TAPE CARTRIDGE

BACKGROUND OF THE INVENTION

This invention relates generally to a tape cartridge for presenting a tape or web to associated apparatus, and more particularly to a tape cartridge wherein a pair of coaxially mounted reels are urged for rotation in opposite directions with respect to one another to maintain suitable tape tension and drive the take-up reel as tape is withdrawn from the supply reel. The tape cartridge of the present invention is particularly adapted for use with magnetic recording tape Various types of tape cartridges are known in the prior art. These include continuous loop cartridges in which the tape is mounted on a single reel and is withdrawn from the inside of the tape coil and rewound outside of the coil with the difference in length of tape being accommodated by slippage of the tape coil and tape tension is maintained by friction pads and the like. Cartridges including a pair of coaxial reels with one-way drive means between said reels are also known.

OBJECTS AND SUMMARY OF THE INVENTION

It is a general object of the present invention to provide an improved coaxial reel tape cartridge.

It is another object of the present invention to provide a coaxial reel tape cartridge including means for driving the take-up reel as tape is withdrawn from the supply reel and also to maintain suitable tape tension.

The foregoing and other objects of the invention are achieved by a magnetic tape cartridge including a housing having at least an opening at the front of the same, means for coaxially mounting a pair of tape reels within the housing, means for guiding the magnetic tape extending between said reels past the front of said housing adjacent said opening, a back-up roller including spring means urging the roller towards said opening engaging the back of the tape at said opening to provide a yieldable back-up force to cooperate with the capstan of associated apparatus to maintain pressure between the capstan and the tape, and spring means carried by said reels serving to drive the take-up reel as tape is withdrawn from the supply reel, said spring means also serving to urge the reels for rotation in opposite directions to thereby maintain tension in the tape extending between said reels.

DESCRIPTION OF THE PREFERRED EMBODIMENT

The tape cartridge includes a housing 11 having covers 12 and 13. The upper cover is formed with integral front, side and rear walls 16, 17, 18 and 19. After the cartridge is assembled, the cover 13 may be suitably secured to the cooperating wall portions, as by bonding, to form the housing which accommodates the reels, guides and back-up roller to be presently described.

Figure 2:
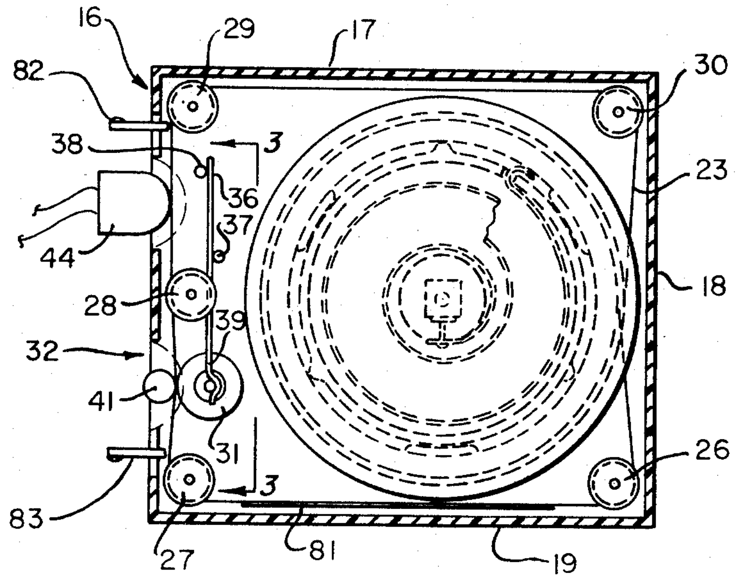
FIG. 2 is a plan view of the tape cartridge with the cover removed.
Figure 3:
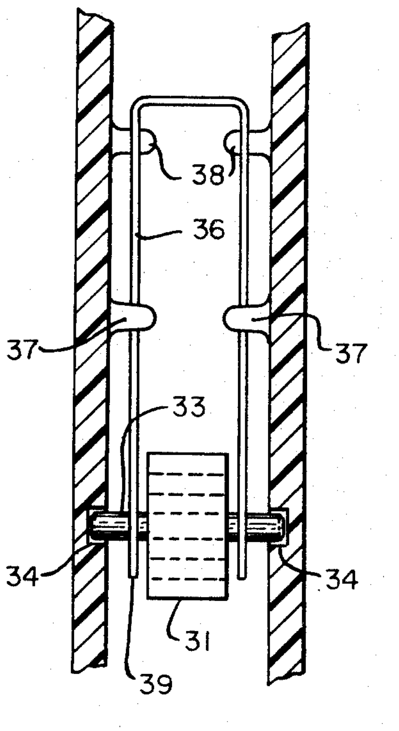
FIG. 3 is an enlarged view taken generally along the line 3—3 of FIG. 2.

Reels 21 and 22 are coaxially disposed in the housing and supported for rotation by a shaft. The reels 21 and 22 are adapted to carry magnetic tape 23 which extends from one reel to the other. Referring particularly to FIG. 2, the tape is reeled on one reel, extends from said reel over guide rollers 26, 27, 28, 29 and 30, and is reeled onto the other coaxially mounted reel. The pulleys 26, 27, 29 and 30 are preferably carried on shafts which are mounted at a small angle with respect to the tape cartridge so as to provide a low-cost means of changing tape level as it extends between the upper and lower reels past the front of the cartridge. The roller 28 is mounted on a vertical post disposed in the center of the front whereby to provide backup for the tape as it extends across the front of the cartridge intermediate the upper and lower reels 21 and 22.

Back-up roller 31 is carried behind the opening 32 formed on the front wall. The roller shaft 33 has its upper and lower ends accommodated in elongated slots 34 which run substantially perpendicular to the front of the cartridge on each of the covers whereby the roller shaft may move back and forth. A spring 36 is adapted to engage the shaft 33 on opposite sides of the roller 31. The spring extends in front of spaced posts 37 and behind spaced posts 38. This provides a lever action forcing the end 39 towards the opening 32. As capstan 41 of the apparatus which receives the cartridge engages the tape, it urges the roller towards the rear of the cartridge. However, the spring 36 provides the back-up force which assures that there is pressure between the capstan and tape to provide a slip-free or friction contact between the tape and drive capstan.

Figure 1:
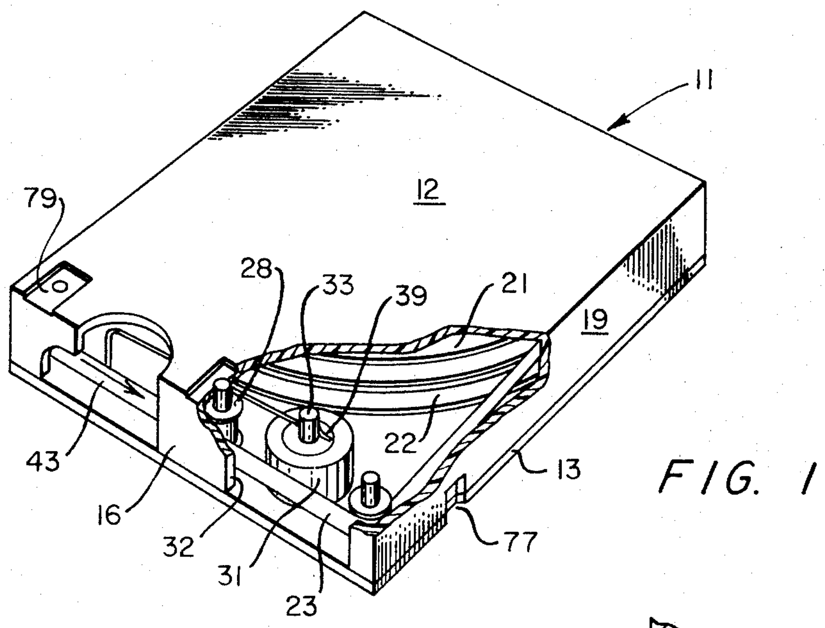
FIG. 1 is a perspective view, partly broken away, of a tape cartridge in accordance with the present invention.

The reels include spring means for driving the take-up reel as tape is drawn from the supply reel across the front of the cartridge by the capstan. During recording or playback, the tape is preferably drawn in the direction of the arrow 43, FIG. 1, so that it is drawn past the magnetic head 44 of the associated magnetic tape apparatus. The spring means also provides a force for rotating the reels in opposite directions to maintain suitable tape tension.

Figures 5, 6, 7:
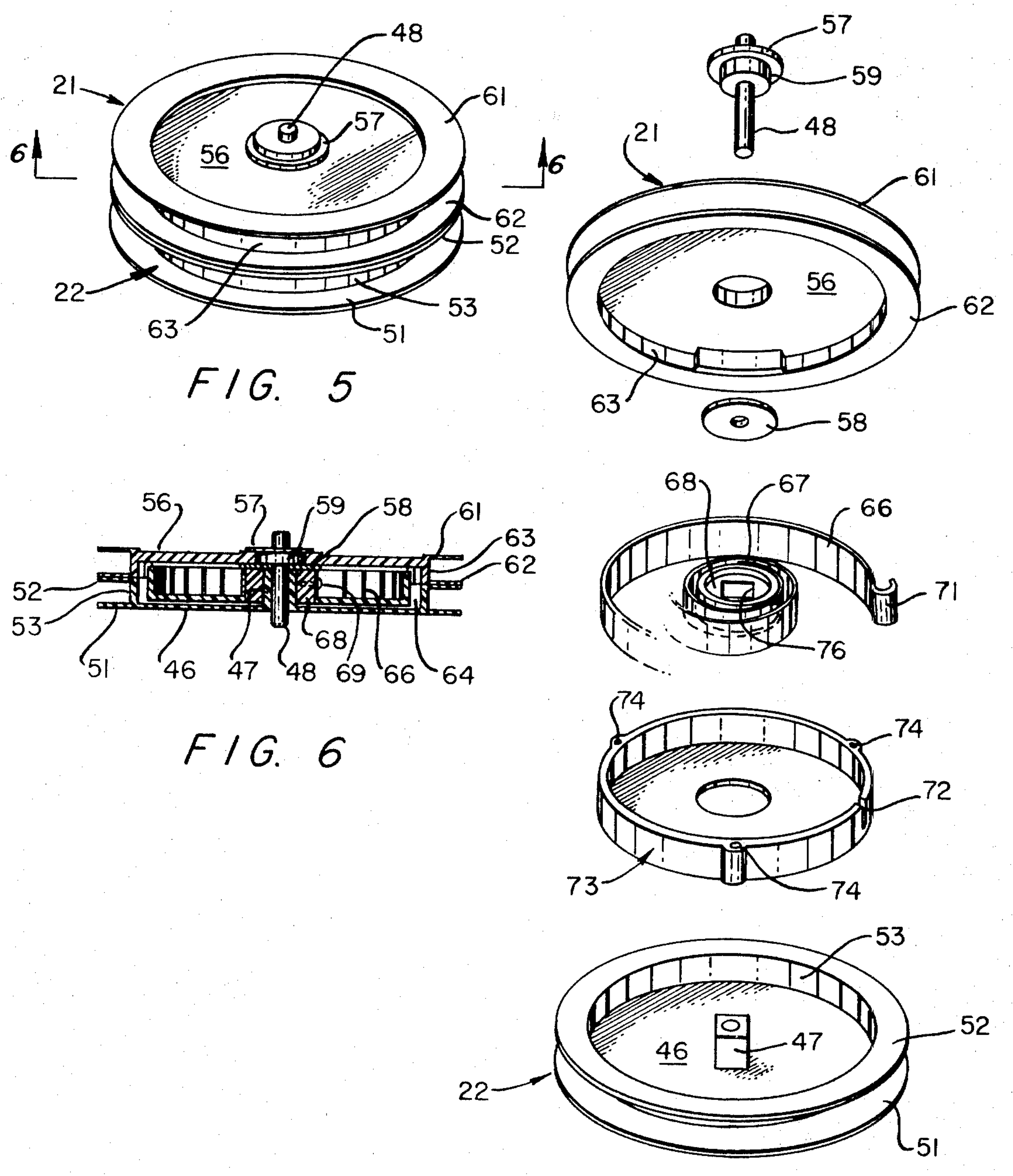
FIG. 5 is an enlarged view showing the coaxial reels.
FIG. 6 is a sectional view taken along the line 6—6 of FIG. 5.
FIG. 7 is an exploded view of the coaxial reels shown in FIG. 5.

Referring more particularly to FIGS. 5–7, the coaxially mounted reels 21 and 22 and spring means are more clearly shown. The reel 22 includes a disc 46 which has an integral upstanding hub 47 which is journalled on the shaft 48. The outer portion of the disc 46 carries spaced flanges 51 and 52 on opposite sides of the rim 53. The upper reel includes a disc 56 which is secured to the shaft 48 by spaced washers 57 and 58 and bushing 59. The outer portion of the disc includes spaced flanges 61 and 62 on opposite sides of rim 63. It is to be understood that the reels 21 and 22 may include a single flange 61 and 51 with the rims 63 and 53 inclined inwardly toward the flange to bias the tape against the respective flanges. The cartridge could then be made slightly thinner.

The cooperating reels define a cavity or space 64 which accommodates the drive assembly. The drive assembly includes a spring 66, such as a clock type spring, or other spirally wound spring. The inside end 67 of the spring is secured to a shaft coupler 68 as, for example, by means of a rivet 69. The outside end 71 of the spring 66 is looped over and is adapted to fit within a notch 72 formed in the outer wall of spring case 73.

The spring and shaft coupler are then placed within the recess defined by the wall 56 and rim 63 and the spring case 73 is secured to the wall 56 as, for example, by rivets extending through the spaced holes 74 formed in the spring case. Thereafter, the reel 22 is brought into face to face coaxial engagement with reel 21 with the upstanding sleeve 47 adapted to be accommodated within the square opening 76 formed in the shaft coupler 68. One of the reels is then filled with the desired length of magnetic tape with the oxide facing outwardly. The extended portion of the tape is then threaded over spaced rollers 26, 27, 28, 29 and 30. The empty reel is then turned to wind up the spring 66 whereby the spring is pre-loaded. Suitable means are inserted to keep the reels from rotating to maintain the spring tension. The free end of the tape is then secured to the empty reel. The retaining means is released. The spring unwinds rotating the reels in opposite directions relative to one another and placing the tape under tension. The cover 13 is then placed over the assembly and serves to hold the cartridge in assembled relationship. Although flat, spirally wound spring has been described, other types of torque springs may be used to urge the reels in opposite directions to maintain the tape tension and drive either reel from the other as tape is withdrawn.

In use, the tape cartridge is inserted into apparatus which includes a guide that positions the tape cartridge properly with respect to the capstan and record and reproduce head 44 of the apparatus. A detent 77, FIG. 1, may be formed on the side of the housing to hold the tape cartridge in position against the head and capstan. When the cartridge is properly positioned, the internal pinch roller is spring loaded against the capstan to provide the drive friction. In order to record information, the capstan is rotated in a clockwise direction as viewed in FIG. 2 so as to pull the tape from the bottom reel (supply reel) around the pulley 30 and pulley 29 across the recording head over pulley 28. This rotates the reel 22 which drives, through spring 66, the reel 21 to pull the tape over pulleys 27, 26 and back onto the reel 21. The spring coupling between the lower reel and upper reel provides the necessary take-up force to wind the tape onto the reel 21. It should be noted that at the beginning of the operation, the lower reel has more tape than the upper reel. When the tape is moved in the forward direction, the upper reel will be required to turn more turns than the lower reel. The motive power for the additional turns of the upper reel is provided by the pre-loaded spring 66. This continues until the tape pack diameter in the upper and lower reels is exactly equal. At this point, both upper and lower reels are turning with a uniform angular velocity. As the tape pack increases on the upper reel so that it has a larger diameter than the lower, the spring will now begin to take up as compared to the time it was paying out. Thus, the spring serves the function of driving the take-up reel from the supply reel and maintaining tape tension.

Figure 4:
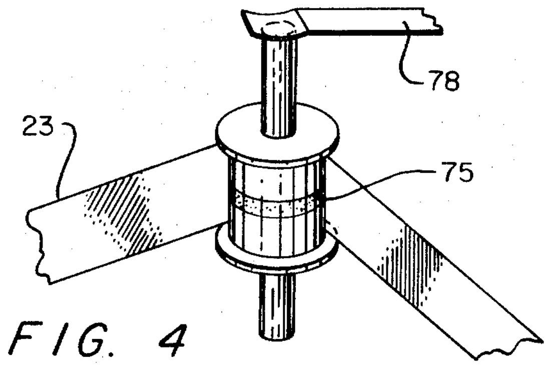
FIG. 4 shows a conductive roller forming a portion of the end of tape sensing means.

In one embodiment of the invention, foil is placed on the inside, the side opposite the coated side, near each end of the tape. The rollers 27, 28 and 29 are either formed of conductive material or include a washer such as the washer 75, FIG. 4, of conductive material which can contact with the foil. In either event, there is electrical connection to the associated shaft. As the foil bridges between either the rollers 27 and 28 or 28 and 29, a conductive connection is provided between the roller shafts. A spring contact member 78, FIG. 4, adapted to ride in the slot or recesses 79, contacts the upper end of the spaced shafts. When the circuit between rollers is completed, it indicates the end of tape. This is like a switch closure and can be used to control the apparatus so that it stops moving the tape.

Another means of sensing the end of tape may include a foil on the oxide surface such as shown at 81. The associated magnetic tape apparatus may be provided with probes 82 and 83 which extend through openings in front of the cartridge and contact the coated side of the tape. When the foil 81 bridges between the probes 82 and 83, it provides a conductive path which is used to control the machine. Still another end of tape sensing system may comprise a single probe which contacts the foil and a connection to the transducer case which also contacts the foil. Alternatively, the second connection may comprise a connection to the capstan.

We claim:

1. A tape cartridge comprising
- a housing having a front wall with an opening therein,
- a shaft supported on said housing and traversing the interior thereof,
- a pair of coaxial reels and a single coaxial spirally wound spring rotatably mounted on said shaft and within said housing, said reels being adapted to carry magnetic tape,
  - each reel comprising a disc and a circular rim depending from said disc, the reels being axially spaced with the rims projecting toward each other whereby said rims and discs define an annular cavity,
- an annular case disposed within said cavity,
  - said spring having inner and outer ends and being disposed within said case with the inner end thereof nonrotatably connected to one of said reels,
- means for securing said case to the other of said reels,
- means for connecting the outer end of said spring to said case whereby said spring urges said reels to rotate in opposite directions, and
- means for guiding the portion of tape extending between said reels to present the same adjacent said opening.

2. The cartridge according to claim 1 in which said other reel has an integral hub sleeve extending into said cavity and within said spring, and means for interconnecting the inner end of said spring and said hub sleeve.

3. The cartridge according to claim 2 in which said last named means comprises a coupler to which said spring is secured, said coupler being coaxially disposed about and nonrotatably connected to said sleeve.

4. A tape cartridge comprising a rectangular housing having integral side, rear and front walls and covers permanently secured to opposite edges of said walls, a circular shaft supported on said covers transversely of the interior of said housing, first and second reels disposed within said housing coaxially of said shaft, each of said reels comprising a circular disc, an annular rim connected to said disc proximate to the outer edge thereof, and axially spaced flanges defining with said rim an annular groove for storing magnetic tape, said first reel having an integral multi-sided hub sleeve with a circular bore, said shaft extending through said bore, a spring case disposed coaxially of said shaft within said first and second reels, said case having an annular outer wall, a spirally wound spring contained within the wall of said spring case, a coupler permanently secured to the inner end of said spring and having a multi-sided opening therein, said sleeve of the first reel being inserted into said opening of the coupler whereby the first reel is directly mechanically interconnected to the inner end of said spring, means for connecting the outer end of said spring to said case, and means for connecting the disc of the second reel to the outer wall of said case whereby said second reel is mechanically interconnected to the outer end of the spring.

5 The cartridge according to claim 4 in which said wall of the spring case has a notch, the outer end of said spring being disposed in said notch.

6. The cartridge according to claim 4 in which said front wall has an opening therein, back-up roller means rotatably and yieldably mounted on said covers at said front wall opening, and means for urging said back-up roller means towards said front wall opening comprising a U-shaped spring extending generally parallel to the said front wall with the free ends thereof engaging said roller means on the opposite side from said front wall, and intermediate and remote post means secured to said covers at successively greater distances from said roller means, said spring being disposed on the rear side of the remote post means and on the front side of the intermediate post means whereby to bias said roller means toward said front wall.

* * * * *